(12) United States Patent
Bagepalli

(10) Patent No.: US 8,082,719 B2
(45) Date of Patent: Dec. 27, 2011

(54) WIND TURBINE TOWER JOINTS

(75) Inventor: Bharat S. Bagepalli, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/042,425

(22) Filed: Mar. 7, 2011

(65) Prior Publication Data
US 2011/0154777 A1 Jun. 30, 2011

Related U.S. Application Data

(62) Division of application No. 11/969,463, filed on Jan. 4, 2008, now abandoned.

(51) Int. Cl.
*E04C 3/00* (2006.01)
(52) U.S. Cl. ............ 52/849; 52/845; 138/155; 174/45 R
(58) Field of Classification Search .................. 138/155, 138/120, 135; 52/845, 848, 849, 726.4, 831, 52/FOR. 100, FOR. 116, FOR. 118, FOR. 119; 174/2, 3, 45 R
See application file for complete search history.

(56) References Cited

U.S. PATENT DOCUMENTS

| | | | |
|---|---|---|---|
| 114,138 A | 4/1871 | Hersey | |
| 1,743,439 A | 1/1930 | De Witt | |
| 1,979,141 A | 10/1934 | Clark et al. | |
| 2,301,976 A | 11/1942 | Schellens | |
| 6,191,355 B1 * | 2/2001 | Edelstein | 174/45 R |
| 6,399,881 B2 | 6/2002 | Edelstein | |
| 2005/0005552 A1 | 1/2005 | Shuttleworth et al. | |
| 2006/0123735 A1* | 6/2006 | Fuellhaas et al. | 52/741.13 |
| 2007/0245680 A1 | 10/2007 | Cairo | |
| 2010/0101173 A1 | 4/2010 | Bagepalli | |

FOREIGN PATENT DOCUMENTS
DE 10152018 A1 4/2003
* cited by examiner

*Primary Examiner* — William Gilbert
(74) *Attorney, Agent, or Firm* — William F. Heinze; Ernest G. Cusick; Frank A. Landgraff

(57) ABSTRACT

A wind turbine tower, includes a first substantially tubular wall section having a tapered edge; a second substantially tubular wall section, arranged substantially coplanar with the first wall section, having a flared edge for seating against the tapered edge of the first wall section; and at least one fastener for securing the tapered edge of the first wall section to the flared edge of the second wall section. The at least one fastener includes a bolt extending through the tapered edge and the flared edge, and the bolt is arranged substantially perpendicular to a longitudinal axis of the first and second wall sections.

7 Claims, 3 Drawing Sheets

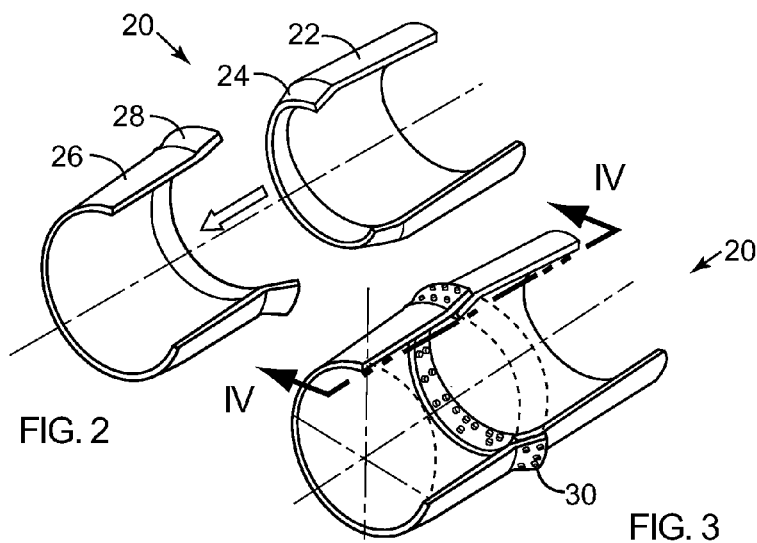
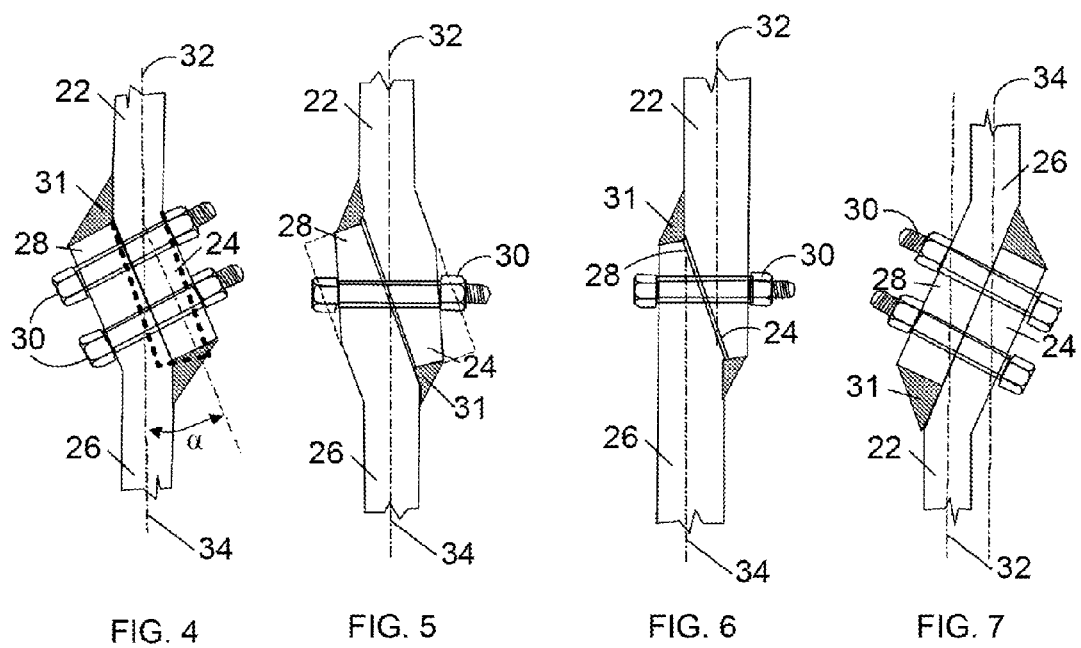

WIND TURBINE TOWER JOINTS

CROSS REFERENCE TO RELATED APPLICATION

This application claims priority to and is a divisional of U.S. patent application Ser. No. 11/969,463, entitled "Wind Turbine Tower Joints," filed on Jan. 4, 2008 now abandoned which is incorporated herein by reference in its entirety.

BACKGROUND OF THE INVENTION

1. Technical Field

The subject matter described here generally relates to static structures including a rigid member having a limited closed periphery and which is greatly elongated relative to any lateral dimension, and, more particularly, to joints for wall sections of wind turbine towers.

2. Related Art

A wind turbine is a machine for converting the kinetic energy in wind into mechanical energy. If that mechanical energy is used directly by machinery, such as to pump water or to grind wheat, then the wind turbine may be referred to as a windmill. Similarly, if the mechanical energy is further transformed into electrical energy, then the turbine may be referred to as a wind generator or wind power plant.

Wind turbines use one or more airfoils in the form of a "blade" to generate lift and capture momentum from moving air that is them imparted to a rotor. Each blade is typically secured at its "root" end, and then "spans" radially "outboard" to a free, "tip" end. The front, or "leading edge," of the blade connects the forward-most points of the blade that first contact the air. The rear, or "trailing edge," of the blade is where airflow that has been separated by the leading edge rejoins after passing over the suction and pressure surfaces of the blade. A "chord line" connects the leading and trailing edges of the blade in the direction of the typical airflow across the blade. The length of the chord line is simply the "chord."

Wind turbines are typically categorized according to the vertical or horizontal axis about which the blades rotate. One so-called horizontal-axis wind generator is schematically illustrated in FIG. 1 and available from GE Energy of Atlanta, Ga. USA. This particular configuration for a wind turbine 2 includes a tower 4 supporting a drive train 6 with a rotor 8 that is covered by a protective enclosure referred to as a "nacelle." The blades 10 are arranged at one end of the rotor 8, outside the nacelle, for driving a gearbox 12 connected to an electrical generator 14 at the other end of the drive train 6 arranged inside the nacelle along with a control system 16. An anemometer 18 is also provided on the nacelle for providing information to the control system 16.

The wind turbine tower 4 is typically formed from several tubular, frustro-conical sections that are stacked on top of each other. For example, commonly-owned co-pending U.S. patent application Ser. No. 11/399,829 by Ronald Cairo discloses "Methods and Apparatus for Assembling Wind Turbine Towers." In that publication, the members include a protrusion that extends radially and circumferentially outward at a bottom end, defining an annular notch for receiving the top end of a second tower member. At least one bolt may be extended through second tower member protrusion and first tower member top end in order to increase the structural integrity of the joint formed by interlocking first tower member and the second tower member. The tower members may also be provided with vertical flanges that are substantially aligned to form a joint.

Other wind turbine tower configurations have been provided with inner or outer flanges that that are normally welded to the peripheral wall portions. For example, commonly-owned and co-pending U.S. patent application Ser. No. 10/517,585 by Wolfgang Fuelhaas and Holger Lühn discloses a "Method for Generating a Substantially Uninterrupted Connection of the Peripheral Wall Portions," and an English-language abstract of German Patent Publication No. DE10152018 by Marc Seidel discloses "Component arrangement for manufacturing tower for wind power system has components with boundary surfaces bounding test channel enabling testing of contact between components."

However, wind turbine towers with such flanged, connections suffer from a variety of drawbacks. For example, the flanges require additional material, welding, inspection and labor resources to install and inspect. Flanges can also cause positioning and bending problems, particularly during transportation and storage where protruding flanges can interfere with stacking and impinge upon other structures.

BRIEF DESCRIPTION OF THE INVENTION

These and other aspects of such conventional approaches are addressed here by providing, in various embodiments, a wind turbine tower including a first substantially tubular wall section having a tapered edge; a second substantially tubular wall section, arranged substantially coplanar with the first wall section, having a flared edge for seating against the tapered edge of the first wall section; and at least one fastener for securing the tapered edge of the first wall section to the flared edge of the second wall section.

BRIEF DESCRIPTION OF THE DRAWINGS

Various aspects of this technology invention will now be described with reference to the following figures ("FIGs.") which are not necessarily drawn to scale, but use the same reference numerals to designate corresponding parts throughout each of the several views.

FIG. 2 is an exploded orthographic view of a joint for the wind turbine tower shown in FIG. 1.

FIG. 3 is a partial orthographic view of a joint for the wind turbine tower shown in FIG. 1.

FIG. 4 is a cross section of the joint for a wind turbine shown in FIG. 3.

FIG. 5 is an alternative cross section for the joint for a wind turbine shown in FIG. 3.

FIG. 6 is an alternative cross section for the joint for a wind turbine shown in FIG. 3.

FIG. 7 is an alternative cross section for the joint for a wind turbine shown in FIG. 3.

DETAILED DESCRIPTION OF THE INVENTION

Figure 1:
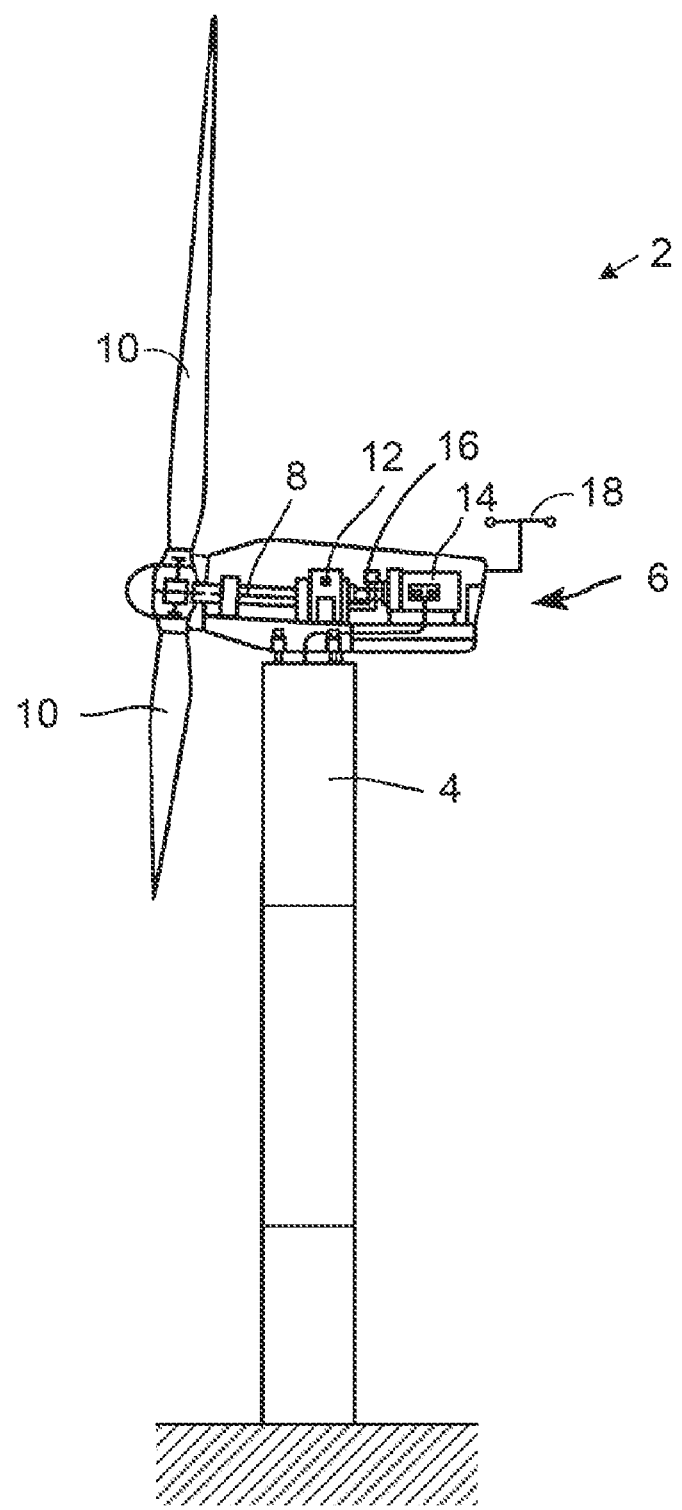
FIG. 1 is a schematic side view of a conventional wind turbine.

FIGS. 2 and 3 are partial orthographic views of junctions or joints 20 for connecting two wall sections of the wind turbine tower 4 shown in FIG. 1. However, the joint 20 may be used with any other wind turbine tower. The wall sections described here are typically formed from rolled steel; however, other materials and manufacturing processes may also be used. Unlike conventional wind turbine towers, the illustrated joints 20 do not necessarily require conventional flanges which can suffer from the various drawbacks discussed above.

In the examples illustrated in FIGS. 2 and 3, a first wall section 22 is provided with a tapered edge 24, and a second wall section 26 is provided with a flared edge 28. However, the positions of the tapered edge 24 and the flared edge 28 may be reversed and/or the tapered edge 24 and/or the flared edge 28 may be provided on opposites ends of each of the wall section sections 22 and 26. Although the first wall section 22 and the second wall section 26 are illustrated in these examples as being closed and substantially cylindrical, other non-cylindrical and/or conical wind turbine tower shapes may also be used, including shapes that are open or partially open.

As best illustrated in FIG. 2, the first wall section 22 slides in to the second wall section 26 so that the flared edge 28 seats against the tapered edge 24. As best illustrated in FIG. 3, the tapered edge 24 of the first wall section 22 may be further secured to the flared edge 28 of the second wall section 26 by a fastener 30, including, but not limited to, the illustrated bolts extending through the tapered and flared edges. For example, the fasteners 30 may also include rivets, screws, pins, clamps, lugs, welding or brazing, adhesive, and/or any combinations of such materials. The fasteners 30 may be in a single row or multiples rows extending around the perimeter of the joint 20.

FIGS. 4-7 are cross-sectional illustrations of various configurations for the joint 20 taken along section line IV-IV in FIG. 3. Each of these embodiments is additionally provided with two, optional filet welds 31 where the wall section of one member meets the tapered or flared edge of the other member. For example, the illustrated welding or brazing patterns may extend continuously or intermittently around the periphery of the tower 4. However, other welding patterns may also be used. Any gaps between mating wall section may also be filled and/or sealed with other materials.

In FIG. 4, the dashed line illustrates an initial position of the tapered edge 24 before being friction-fit against the flared edge 28. Each of the other embodiments may also be provided with a similar friction-fitting configuration for the tapered and/or flared edges 24, 28. Alternatively, the various embodiments may be provide without looser fits.

In the examples shown in FIGS. 4 and 5, the first and second wall sections 22 and 26 are arranged substantially coplanar in order to provide a good load path to ground. In these examples, the axis 32 of the first wall section 22 is aligned with the axis 34 of the second wall section 26 so that the tapered edge forms an angle α with respect to the axis 32 and 34. For example, the taper/flare angle α may be between one and ten degrees. Alternatively, the taper/flare angle α may be less than one degree or greater than ten degrees depending upon a variety of factors such as structural deflection, surface finish, run-out, and roundness.

In the example shown in FIG. 5, the exposed surfaces of the surfaces of the aligned wall sections 22 and 26 have been trimmed to remove the material shown by the dashed lines. Consequently, the fastener 30 extends substantially perpendicular to the longitudinal axis 32, 24 of the first and second wall sections.

In the examples shown in FIGS. 6 and 7, the first and second wall sections 22 and 26 are arranged in different planes, resulting in a less direct load path between the wall sections. In these examples, the axis 32 of the first wall section 22 is spaced from the axis 34 of the second wall section 26. While the axis 32 and 34 are arranged substantially parallel in these examples, these axis may also be arranged so that are not parallel. In the example illustrated in FIG. 6, the tapered edge 24 in the first wall section 24 and the flared edge 28 in the second wall section 26 may be formed without bending the wall corresponding sections 22 and 26.

Figures 8, 9:
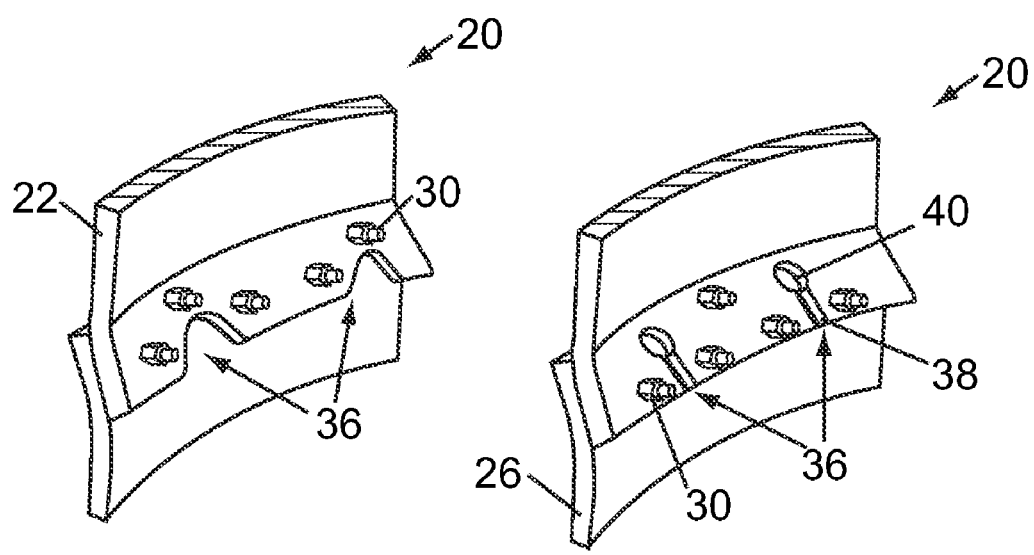
FIG. 8 is an enlarged partial orthographic view of the joint for a wind turbine tower shown in FIG. 3.
FIG. 9 is an alternative enlarged partial orthographic view of the joint for a wind turbine tower shown in FIG. 3.

FIGS. 8 and 9 illustrate alternative, enlarged partial orthographic views of the joint 20 for a wind turbine tower shown in FIG. 3. In these examples, a relief cut 36 is arranged in the periphery of the tapered edge 24. However, similar relief cuts may also be arranged in the periphery of the flared edge 28 and/or elsewhere in the wall sections 22 and 26. Similar relief cuts 36 may also be provided for the various other embodiments discussed above.

The relief cuts 36 provides enhanced flexibility and accommodate local deflection of the tapered and/or flared edges 24, 28 during assembly of the joint 20. The relief cuts 36 also help to avoid cracking and otherwise facilitate interference fitting of the joint 20. In the example shown in FIG. 8, the relief cut is semi-circular in shape. However, other shapes may also be used including, elliptical, slotted, I-shaped, V-shaped, U-shaped, pentagonal, hexagonal, and/or combinations thereof. For example, FIG. 9 illustrates a relief cut 36 including a slot 38 extending from the periphery of the tapered edge with a substantially circular hole 40 at one end.

The relief cuts 36 and/or slots 38 can placed along the free edges of both of the mating tower sections. For example, the relief cuts 36 and/or slots 38 may be equally or unequally distributed around the periphery in alternating thirty degree segments around either or both of the first wall section 22 and/or second wall section 26. The material between relief cuts 36 or slots 38 may also be bent radially outward or inward so as to provide an interference fit with respect to the mating surface of the corresponding tower segment. In these and other configurations, the relief cuts 36 are particularly helpful for mating large diameter sections, such those as used for wind turbine towers 4, where the tight tolerances needed for good mating of the contacting surfaces can otherwise be difficult to achieve.

The technology described above provides various advantages over conventional approaches. For example, the various tubular sections of the tower 4 may be rolled with mating tapered and flared ends, minimizing the need for flanges that would otherwise require welding to the walls of those sections. The elimination of conventional flanges results in significant cost savings for labor, material, welding, inspection, and weight. Without flanges extending from each wall, smaller tubular sections can be slid inside larger ones for improved logistical arrangements and storage.

The load-path to ground in the coplanar configurations of the mating wall sections in is more direct than when conventional flanges are used, thus causing less bending of the plates. However, mating wall sections of different sizes can also be accommodated with non-coplanar arrangements of the wall sections 22 and 24 in the joints 20. The taper/flare angle α may also be easily varied in order to achieve various design parameters, such as tightness of the friction fit.

During assembly, the relief cuts 36 help to accommodate local deflection of the tapered and/or flared edges 24, 28 and interference fitting with the mating wall sections so as to enhance the bond between the sections. The joints 20 may also be provided with radial and/or inclined bolting arrangement, in single row or multiple rows, depending on the need for the joint 20 to resist various types of loads. Tower platforms and/or other features may them be bolted to the joints 20, and welds can be later added in order to further strengthen the joints It should be emphasized that the embodiments described above, and particularly any "preferred" embodiments, are merely examples of various implementations that have been set forth here to provide a clear understanding of various aspects of this technology. It will be possible to alter many of these embodiments without substantially departing from scope of protection defined solely by the proper construction of the following claims.

What is claimed is:

1. A wind turbine tower, comprising:
   a first substantially tubular wall section having a first substantially constant diameter and having a tapered edge;
   a second substantially tubular wall section having a second substantially constant diameter and arranged with the first wall section, having a flared edge for seating against the tapered edge of the first wall section, the first diameter and the second diameter being substantially the same; arranged substantially coplanar with the first wall section, having a flared edge for seating against the tapered edge of the first wall section;
   at least one fastener for securing the tapered edge of the first wall section to the flared edge of the second wall section;
   wherein the at least one fastener comprises a bolt extending through the tapered edge and the flared edge; and
   wherein the bolt is arranged substantially perpendicular to a longitudinal axis of the first and second wall sections.

2. A wind turbine tower, comprising:
   a first substantially tubular wall section having a first substantially constant diameter and having a tapered edge;
   a second substantially tubular wall section having a second substantially constant diameter and arranged with the first wall section, having a flared edge for seating against the tapered edge of the first wall section, the first diameter and the second diameter being substantially the same; arranged substantially coplanar with the first wall section, having a flared edge for seating against the tapered edge of the first wall section;
   a bolt extending through the tapered edge and the flared edge for securing the tapered edge of the first wall section to the flared edge of the second wall section, wherein the bolt is arranged substantially perpendicular to a longitudinal axis of the first and second wall sections; and
   a relief cut arranged in a periphery of at least one of the tapered edge and the flared edge, wherein the relief cut comprises a slot extending from a periphery of at least one of the tapered edge and the flared edge.

3. The wind turbine tower recited in claim 2, further comprising a weld for securing the tapered edge of the first wall section to the flared edge of the second wall section.

4. A wind turbine tower, comprising:
   a first substantially tubular wall section having a first substantially constant diameter and having a tapered edge;
   a second substantially tubular wall section having a second substantially constant diameter and having a flared edge for seating against the tapered edge of the first wall section, the first diameter and the second diameter being substantially the same; having a flared edge for seating against the tapered edge of the first wall section;
   a relief cut arranged in a periphery of at least one of the tapered edge and the flared edge;
   at least one fastener for securing the tapered edge of the first wall section to the flared edge of the second wall section.
   wherein the at least one fastener comprises a bolt extending through the tapered edge and the flared edge; and
   wherein the bolt is arranged substantially perpendicular to a longitudinal axis of the first and second wall sections.

5. A wind turbine tower, comprising:
   a first substantially tubular wall section having a first substantially constant diameter and having a tapered edge;
   a second substantially tubular wall section having a second substantially constant diameter and arranged with the first wall section, having a flared edge for seating against the tapered edge of the first wall section, the first diameter and the second diameter being substantially the same; arranged substantially coplanar with the first wall section, having a flared edge for seating against the tapered edge of the first wall section;
   at least one bolt for securing the tapered edge of the first wall section to the flared edge of the second wall section;
   a relief cut arranged in a periphery of at least one of the tapered edge and the flared edge; and
   wherein the bolt is arranged substantially perpendicular to a longitudinal axis of the first and second wall sections.

6. The wind turbine tower recited in claim 5, further comprising a weld for securing the tapered edge of the first wall section to the flared edge of the second wall section.

7. The wind turbine tower recited in claim 6, wherein the relief cut comprises a slot having a substantially circular hole at one end.

* * * * *